United States Patent Office 3,420,211
Patented Jan. 7, 1969

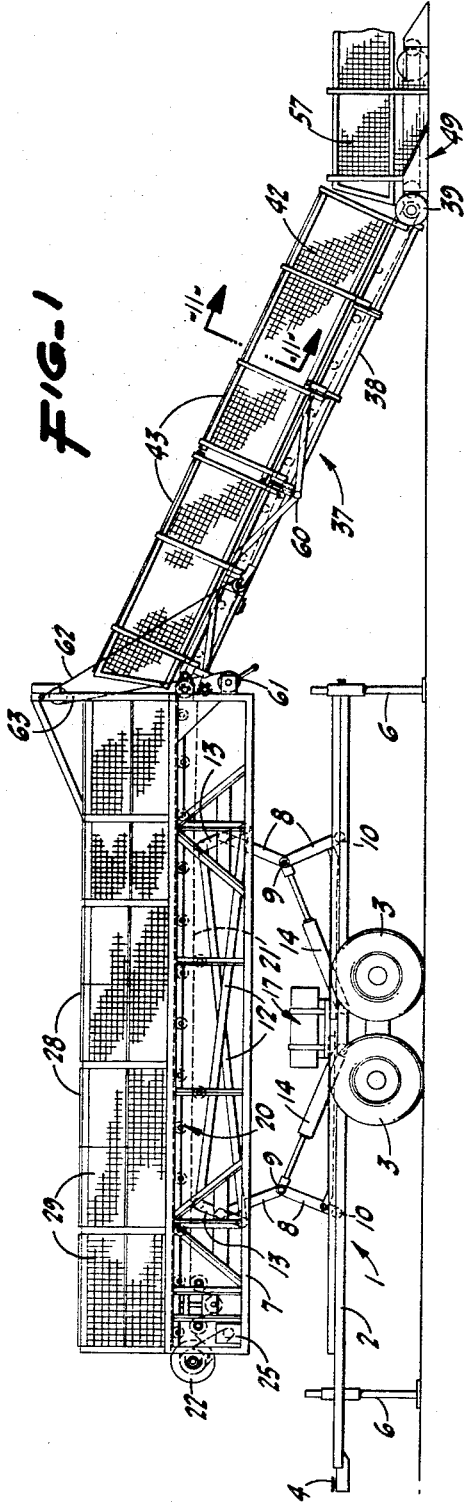

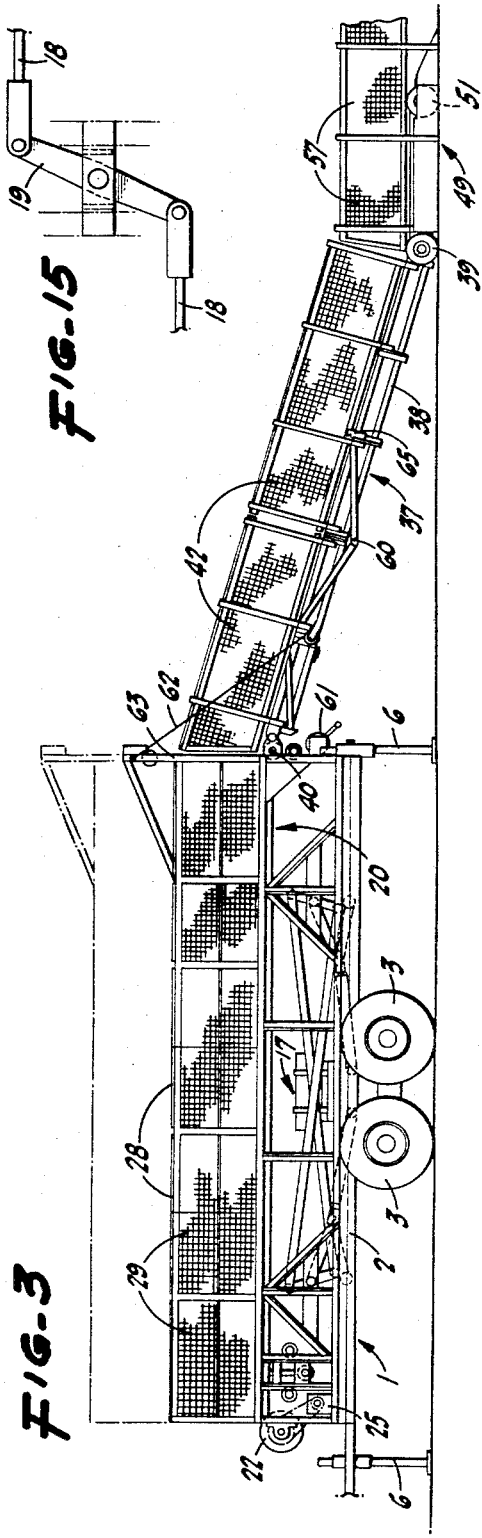

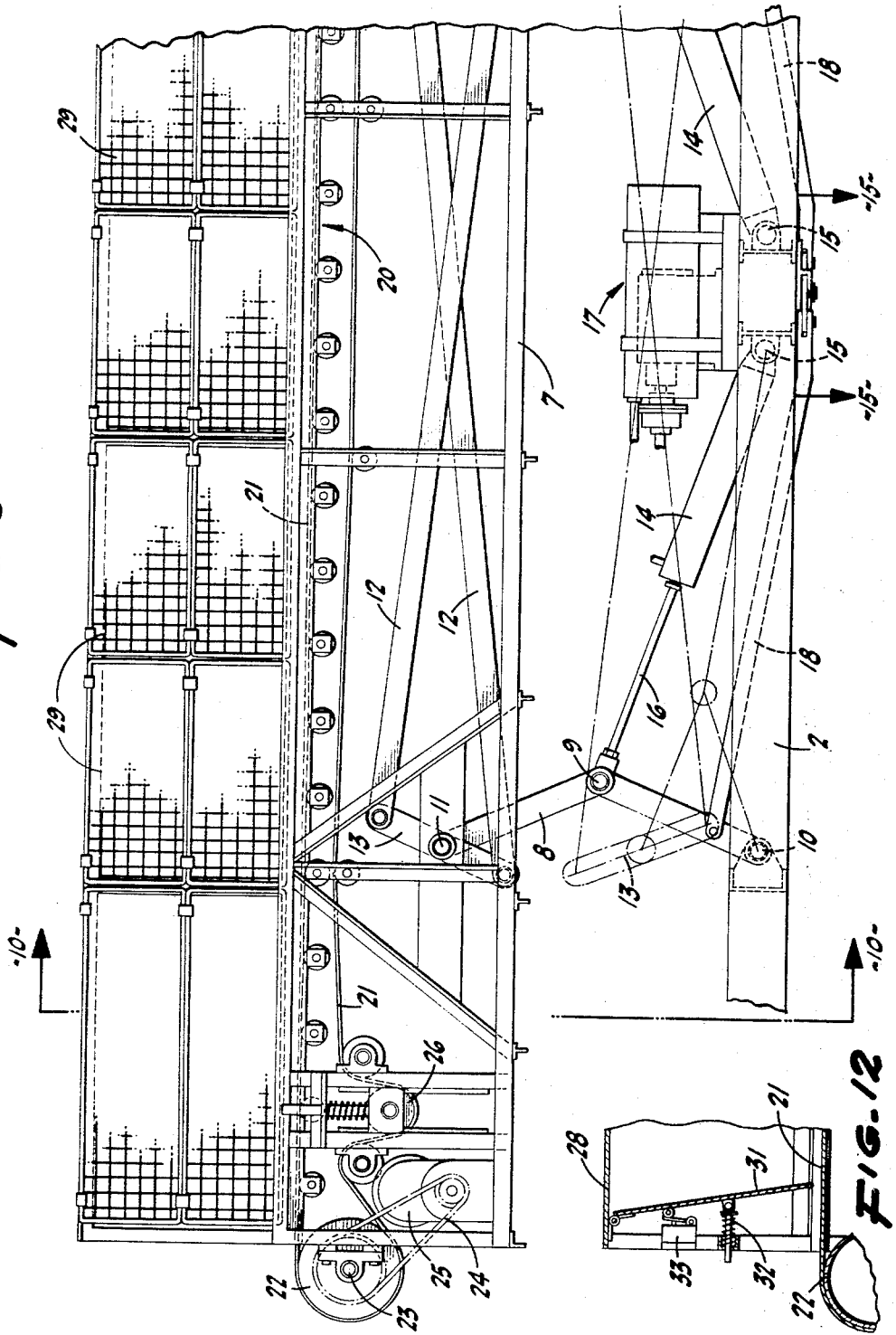

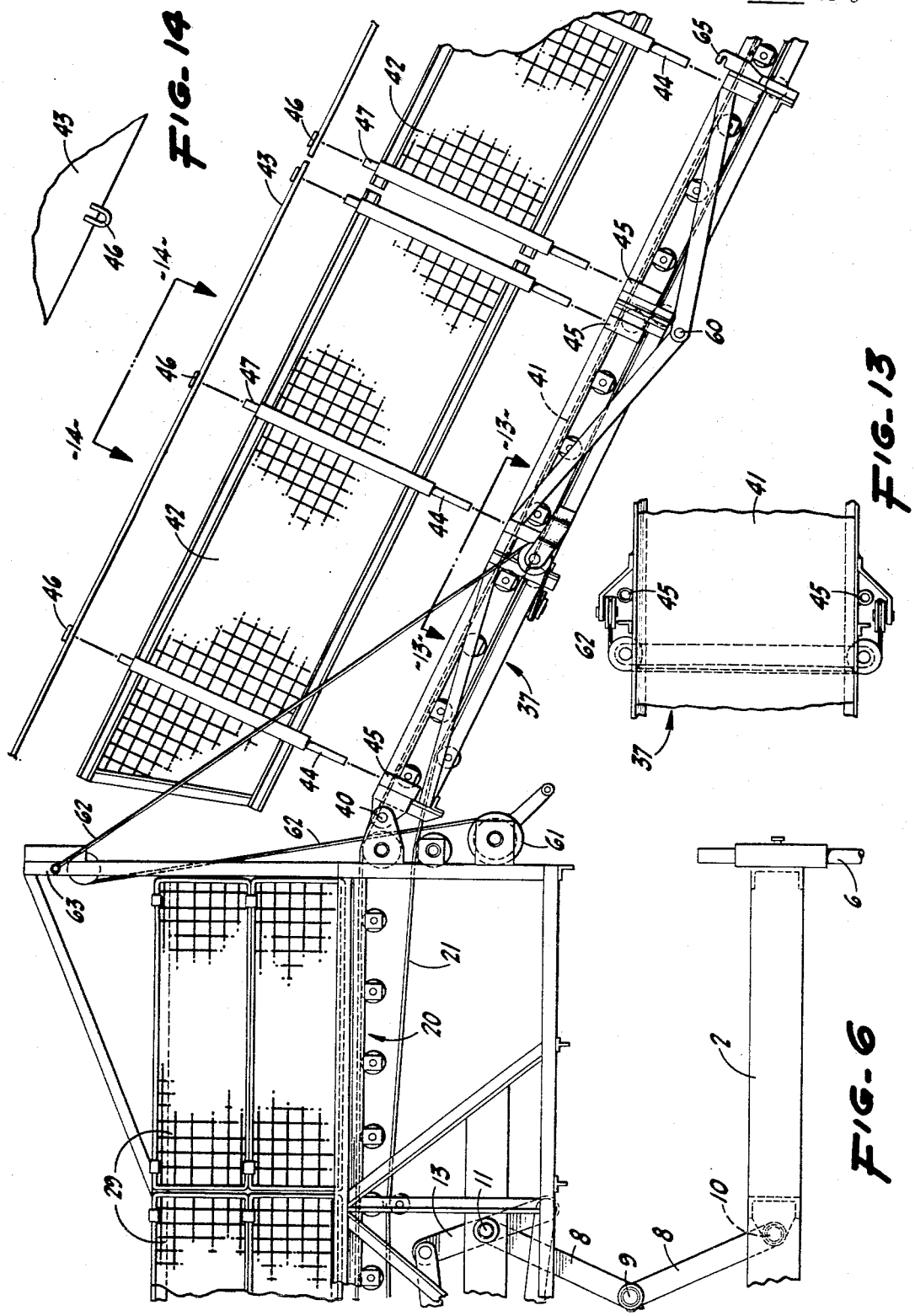

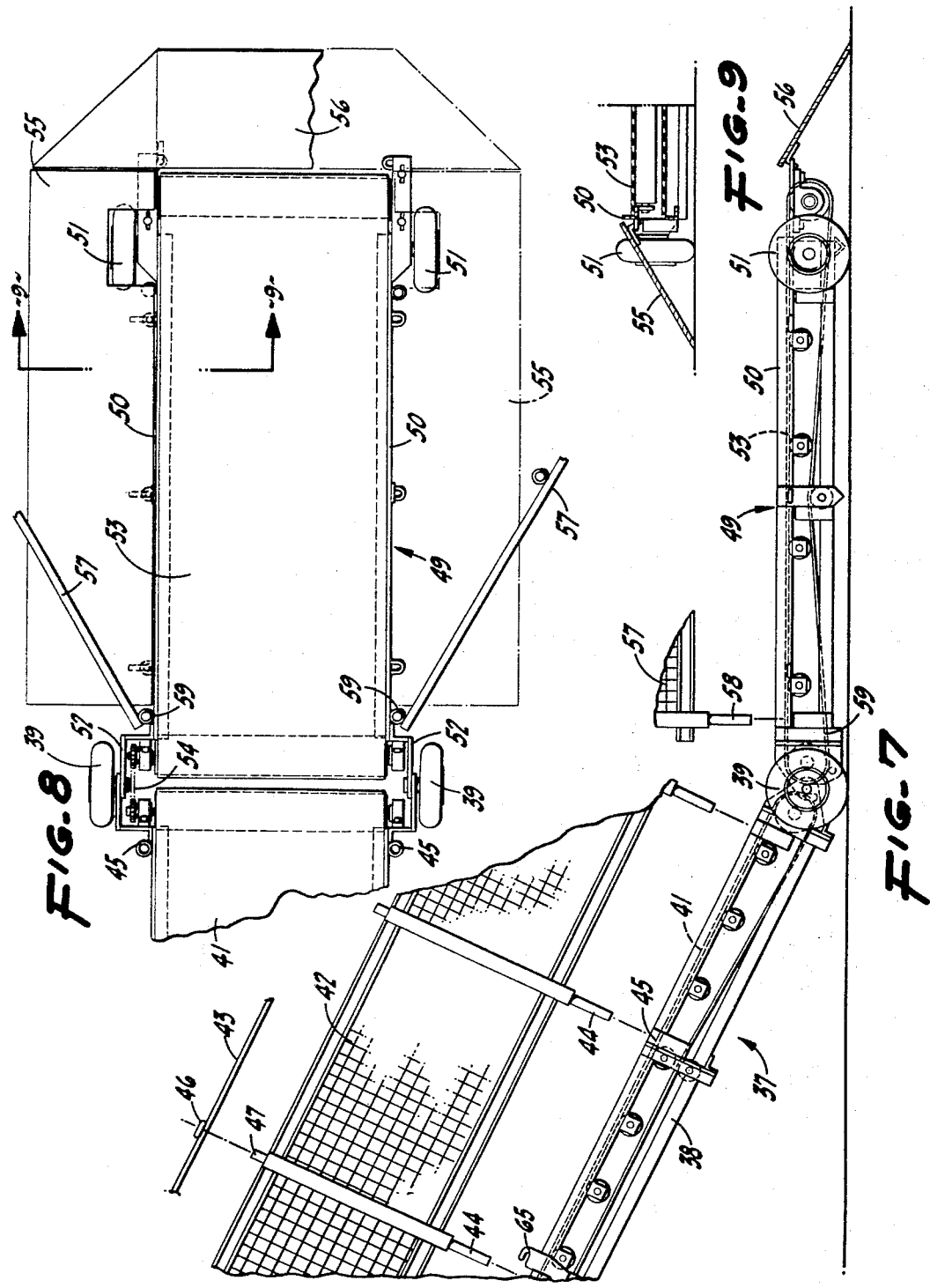

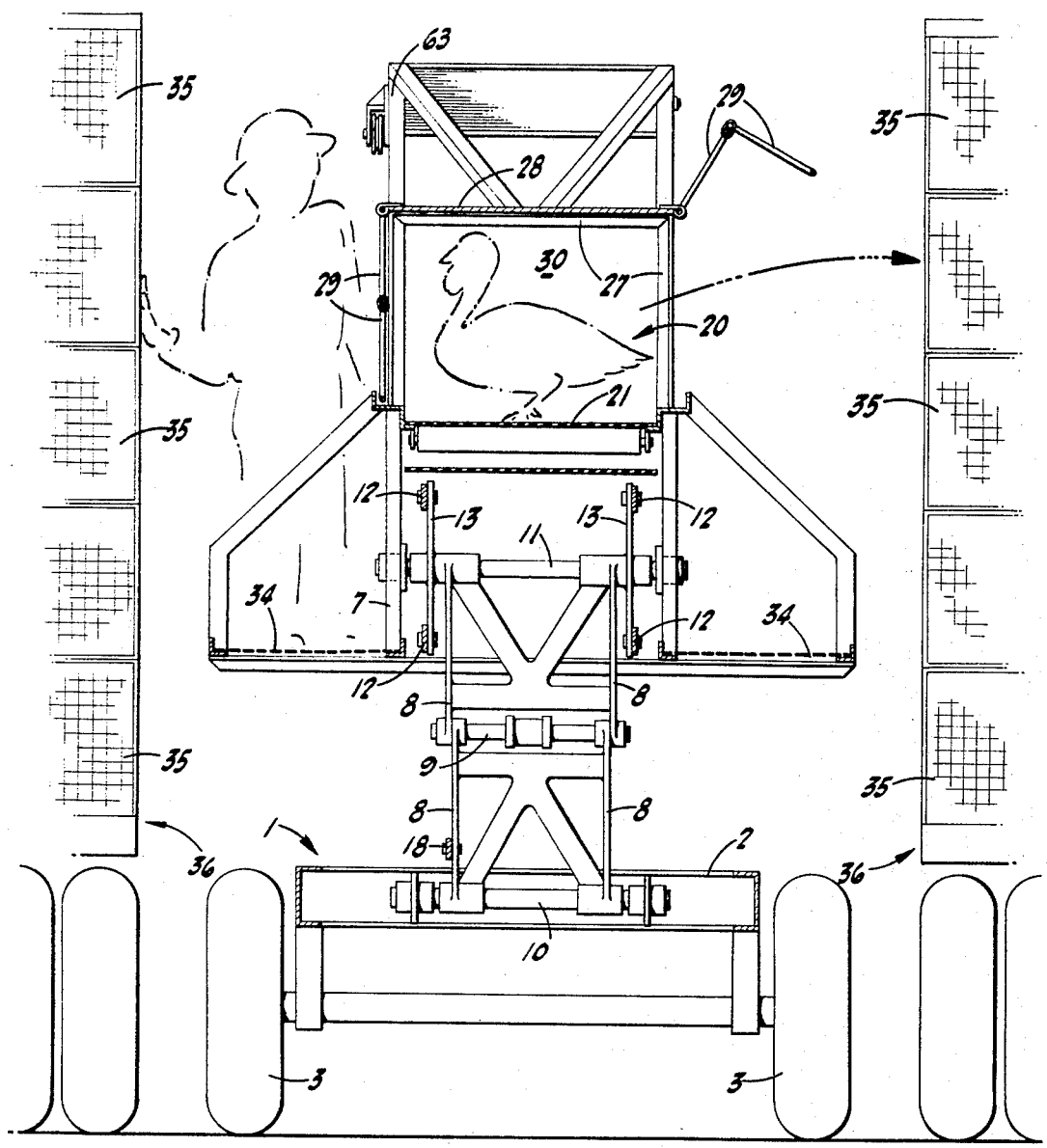
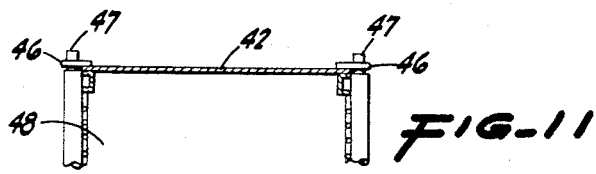

3,420,211
TURKEY HANDLING MACHINE
Norman W. Hartvickson, 110 A St., Turlock,
Calif. 95380
Filed Jan. 16, 1967, Ser. No. 609,601
U.S. Cl. 119—82    10 Claims
Int. Cl. A01k *31/06;* B65g *21/12*

ABSTRACT OF THE DISCLOSURE

A portable machine especially adapted but not limited for use by the turkey transport industry and particularly as an aid in loading live turkeys at a farm into coop trucks for transport to a processing plant. A conveyor system carries the turkeys to an elevated position for convenient manual transfer into the coops of the trucks.

Background of the invention

Heretofore it has been a common practice for coop trucks to be loaded by workers standing on a stationary alongside platform; the live turkeys being grasped and handed up to such workers by other workers standing on the ground. This has been a tedious and labor-consuming operation.

Summary of the invention

The present invention provides, as its major object, a portable power-actuated machine into which the live turkeys are herded at ground level and then elevated to and received on a horizontally elongated caged traveling platform adjustable relative to the tiers of coops of an alongside coop truck; the machine having catwalks, vertically adjustable as a unit with said caged traveling platform, which support workers who first manually grasp and remove live turkeys from such caged traveling platform through side doors therein and then turn and place the grasped turkeys in the adjacent coops of the truck.

The present invention provides, as an additional important object, a novel conveyor system for the live turkeys and of which system the aforementioned caged traveling platform is a part.

The present invention provides, as an additional important object, means to automatically discontinue movement of the traveling platform should it become overloaded with live turkeys.

The present invention provides, as a further object, a portable machine of the character described which is of trailer-type and wherein certain of the parts are foldable and others removable and stacked for travel from point to point; the machine, however, being readily and conveniently assembled for use.

The present invention provides, as a still further object, a practical, reliable, and durable turkey handling machine which is exceedingly effective for the purpose for which it is designed.

Brief description of the drawings

FIG. 1 is a side elevation of the machine assembled for use and with the caged traveling platform in a raised position.

FIG. 2 is a diagrammatic plan view of the assembled machine, with the cover panels omitted from the caged traveling platform and the elevator conveyor.

FIG. 3 is a view similar to FIG. 1 but shows the caged traveling platform in lowered position.

FIG. 4 is a side elevation of the machine as arranged for transport.

FIGS. 5 and 6 together comprise an enlarged but fragmentary side elevation of the machine as in FIG. 1.

FIG. 7 is an enlarged fragmentary side elevation of the lower portion of the elevator conveyor and the conveyor unit which feeds thereto; the view showing the removable fence sections in part and in exploded relation. The near side ramp is omitted and the end ramp is in section.

FIG. 8 is a fragmentary plan view of substantially the structure shown in FIG. 7.

FIG. 9 is a fragmentary transverse sectional elevation substantially on line 9—9 of FIG. 8.

FIG. 10 is an enlarged transverse sectional elevation substantially on line 10—10 of FIG. 5; the view showing the machine as in use with the coop trucks alongside.

FIG. 11 is an enlarged, fragmentary, transverse sectional elevation substantially on line 11—11 of FIG. 1.

FIG. 12 is an enlarged, fragmentary, longitudinal sectional elevation substantially on line 12—12 of FIG. 2.

FIG. 13 is a fragmentary plan view substantially on line 13—13 of FIG. 6.

FIG. 14 is a fragmentary plan view substantially on line 14—14 of FIG. 6.

FIG. 15 is a fragmentary plan view substantially on line 15—15 of FIG. 5.

FIG. 16 is an enlarged, fragmentary, side elevation showing the upper portion of the feed-in conveyor unit as positioned for transport.

Description of the preferred embodiment

Referring now more particularly to the drawings and to the characters of reference marked thereon, the machine comprises an elongated trailer, indicated generally at 1, which includes a longitudinal main frame 2 supported intermediate its ends by wheels 3; the main frame 2 being fitted at the front with a hitch 4 for connection to a towing vehicle 5. When the machine is in use, the main frame 2 is supported at the corners and from the ground by vertically adjustable leveling posts 6.

An elongated, box-like secondary frame 7, of skeleton construction, is vertically adjustably mounted in connection with and above the main frame 2 by means of double-sided, toggle-type jacks 8; such jacks 8 each including a central cross shaft 9, a lower cross shaft 10 journaled on the main frame 2, and an upper cross shaft 11 journaled on the vertically adjustable secondary frame 7. In order to maintain the secondary frame 7 horizontal at all times, transversely spaced pairs of longitudinally extending leveling bars 12 pivotally connect with an extend between the related upper and lower ends of double-ended radial levers 13 which are centrally fixed to corresponding ends of the jacks 8.

Such jacks 8 are initially in a folded position and at which time the secondary frame 7 is in lowered position on frame 2; said jacks 8, which unfold away from each other and in directions toward corresponding ends of the trailer 1, are actuated as follows:

A pair of fluid pressure actuated power cylinders 14 are pivoted at their lower ends, as at 15, on the main frame 2 substantially centrally of its ends and thence extend upwardly in diverging relation; the piston rods 16 of such power cylinders being connected to the upper cross shafts 11 of the corresponding jacks 8. Thus, when the power cylinders are energized and the piston rods thrust out, the jacks 8 are unfolded and their effective vertical extent is increased whereby the secondary frame 7 is raised relative to the main frame 2 and held in a selected but variable position thereabove.

The power cylinders 14 are energized simultaneously by a conventional valve-controlled fluid pressure conduit system which includes an electric motor driven pump and reservoir unit 17 mounted on the main frame 2; such system and unit preferably being hydraulic.

In order that the power cylinders 14 each have exactly the same distance of thrust when energized, and as necessary to further assure that the secondary frame 7 remains horizontal at all times, longitudinal rods 18 are pivotally connected to the lower portion of the jacks 8 and thence extend to pivotal connection with opposite ends of a double-ended horizontal lever 19 centrally pivoted on the main frame 2. See FIG. 15.

The secondary frame 7 provides the mount for an elongated, caged traveling platform indicated generally at 20; such platform comprising a driven endless belt 21 roller-supported along the upper portion of said secondary frame. The endless belt 21—whose upper run travels forwardly—passes at the front end about and is driven by a pulley 22 on a cross shaft 23 which in turn is actuated by an endless drive 24 coupled to an electric motor and gear box unit 25 of a conventional type. Also, adjacent such unit 25, the lower run of endless belt 21 is trained through a spring-urged belt tightener 26.

For the full length of frame 7 a cage is provided over the endless belt 21 by means of upstanding supporting frames 27 which are the mount for non-removable, roof-forming, cover panels 28 disposed some distance above such belt; a longitudinal row of wire mesh covered, upwardly foldable, gravity closed doors 29 depending from opposite edges of the panels 28 to define the sides of the cage. The tunnel 30, formed above the endless belt 21 by the cover panels 28 and the side doors 29, is open at the rear end but closed at the front end by a hinged, depending closure plate 31; forward swinging of such plate being yieldably resisted by a spring device 32. When, however, the plate 31 is swung forward it operates a switch 33 which in turn—and through suitable circuitry—stops the electric motor and gear box unit 25 and, of course, the endless belt 21.

On each side thereof, and adjacent the bottom, the vertically adjustable secondary frame 7 includes a full length, laterally outwardly projecting catwalk 34; workers standing on such catwalks 34 being in a position for ready manual access to the side doors 29 and can easily open the same. See FIG. 10.

By means of a conveyor arrangement hereinafter described, turkeys are elevated from the ground and delivered into the tunnel 30 from the open rear end thereof; the turkeys traveling forward in said tunnel on the upper run of the endless belt 21. Workers standing on each catwalk 34 open a near side door 29, grasp a turkey in the tunnel 30, withdraw the grasped turkey, and then turn and deposit the turkey in a coop 35 of a coop truck 36 standing alongside the catwalk; there being such a truck parked at each side of the trailer 1. A number of turkeys, depending on the size thereof, is deposited in each coop 35.

The above loading procedure is initiated at the lowermost tier of coops 35 on each truck 36, and after such tier is loaded on both trucks the secondary frame 7 is moved upward by the power cylinders 14 sufficient to permit loading of the next tier of coops on said trucks. This is continued until all the tiers of coops are loaded; the secondary frame then being in a substantially fully raised position. See FIG. 1.

In the event of an overload of turkeys on the forwardly moving upper run of the belt 21, the turkeys press against the closure plate 31 at the front end of the tunnel 30 and cause such plate to swing forward. This operates the switch 33 in a direction which temporarily breaks the circuit for the electric motor and gear box unit 25 and the belt 21 stops. When the overload is relieved, the above parts return to their normal positions and unit 25 again drives belt 21.

The turkeys are elevated from adjacent the ground to and delivered into the open rear end of the tunnel 30 of the caged traveling platform 20 by means of an elongated, caged elevator conveyor indicated generally at 37; such elevator conveyor including an elongated frame 38 which extends in use at a forward and upward incline from ground-engaging wheels 39 (necessary to permit vertical adjustment of the secondary frame 7) to pivotal connection at the upper end, as at 40, with the rear end of said secondary frame 7.

The elevator conveyor 37 is provided, from end to end thereof, with a driven belt 41 which is roller-supported from the elongated frame 38; such belt 41 being endless in the sense that it is an extension of the belt 21. The upper run of the belt 41 moves, of course, in a forward direction and thus upwardly to the open rear end of the tunnel 30. Obviously, and in manufacture, the belt 41 could if desired, be made as a wholly separate endless belt and with appropriate drive means.

In order to prevent escape of the turkeys from belt 41, the elevator conveyor 37 is closed at the sides by removable fence sections 42, and at the top by removable cover panels 43. The fence sections 42 are maintained in place by depending pegs 44 which removably engage in sockets 45 on frame 38. The cover panels 43 are held in place by lateral eyes 46 which removably engage over upstanding pegs 47 on the fence sections 42. The fence sections 42 and cover panels 43 thus cage, and form a tunnel 48 on, the elevator conveyor 37.

In order that turkeys be caused to enter the open lower end of tunnel 48 and move onto the upper arm of belt 41, there is provided a low level, horizontal, initial or feed-in conveyor unit indicated generally at 49. Such feed-in conveyor unit 49 includes a longitudinal frame 50 supported at the rear end by wheels 51 and detachably coupled at the front end, by hooks 52, with the spindles of wheels 39 at the lower end of the elevator conveyor 37; the feed-in conveyor unit thus extending directly rearwardly from said elevator conveyor.

The frame 50 carries a roller-supported endless belt 53 whose upper run moves in a forward direction; such belt 53 being driven at its front end from the lower end of belt 41 by means of a short, endless chain drive 54 whose chain is removable upon hooks 52 being detached from the spindles of wheels 39.

The feed-in conveyor unit 49 is fitted with removable, ground-engaging side ramps 55 and an end ramp 56; there being hook-and-eye connections (as shown) between such ramps and the frame 50. Additionally, wire mesh covered corral fence sections 57 are detachably secured by pegs 58 and sockets 59 to opposite sides of the feed-in conveyor unit 49 at the front thereof; such corral fence sections thence diverging rearward some distance and in multiple extension if necessary.

During a loading operation the turkeys are driven toward and as confined by the corral fence 57 ultimately walk up the ramps 55 and 56 onto the forwardly moving belt 53 of the feed-in conveyor unit 49; the latter then carrying the turkeys forward and depositing them onto the lower end of belt 41 of the caged elevator conveyor 37 and which—in turn—delivers the turkeys onto the rear end of the belt 21 of the caged traveling platform 20. From such traveling platform the turkeys are manually removed through doors 29 and placed in the coops 35 of the trucks 36, all in the manner previously described.

When the turkey-loading operations have been completed at one location and it is desired to transport the machine on the highway, the machine is arranged as follows:

The secondary frame 7 of trailer 1 is first lowered to a full-down position, and then the feed-in conveyor unit 49 is detached by disengaging the hooks 52 and disconnection of the endless chain drive 54. Thereafter, the elevator conveyor 37, which is articulated intermediate its ends, is folded upwardly about pivots 60 and against the rear end of the trailer portion of the machine as shown in FIG. 4; this being accomplished by means of a hand winch 61 provided with a suitably reeved hoist cable 62 associated with a hoist frame 63 on the rear of frame 7.

Before the feed-in conveyor unit 49 and elevator conveyor 37 are manipulated as above, the fence sections 42, cover panels 43, ramps 55 and 56, and corral fence sections 57, are detached and stacked on the top of the trailer as at 64.

After the elevator conveyor 37 has been upfolded to its transport position, the previously detached feed-in conveyor unit 49 is suspended therefrom by hooks 65. See FIGS. 4 and 16. The assembly of folded conveyor 37 and suspended conveyor unit 49 is then bound together and held in position by a safety chain 66.

Lastly, the leveling posts 6 are raised to a ground-clearance position; this being done after the trailer is connected by hitch 4 to the towing vehicle 5.

From the foregoing description, it will be readily seen that there has been produced such a machine as substantially fulfills the objects of the invention, as set forth herein.

While this specification sets forth in detail the present and preferred construction of the machine, still in practice such deviations from such detail may be resorted to as do not form a departure from the spirit of the invention, as defined by the appended claims.

I claim:

1. A machine, for handling domestic fowl, comprising a longitudinal main frame supported from the ground, a longitudinal secondary frame above the main frame, means connected between the main frame and secondary frame operative to raise and lower the latter to selected positions of vertical adjustment, a horizontal elongated traveling platform mounted on the secondary frame, means to deliver fowl from the ground onto said traveling platform at the starting end thereof, cage means enclosing said platform and arranged to prevent escape of fowl from the traveling platform, said cage means including doors along at least one side of the traveling platform, and means on at least the corresponding side of the secondary frame to support workers in position for manual access to said doors and to an adjacent tier of coops of a coop truck disposed alongside the main frame.

2. A machine, as in claim 1, in which the connecting means between the main frame and secondary frame comprises power actuated jacks.

3. A machine, as in claim 2, in which the jacks are of toggle type; there being power cylinders connected between the main frame and said jacks in actuating relation thereto.

4. A machine, as in claim 3, including means associated with the jacks to maintain the secondary frame level, and other means associated with the power cylinders to maintain the throw thereof equal.

5. A machine, as in claim 1, in which the traveling platform includes a driven belt, and the cage means forms a tunnel above such belt; there being means to drive the belt, and a device to discontinue operation of the drive means upon overloading of the belt with fowl in the tunnel, said device including a movable member in the tunnel at the end remote from said starting end of the traveling platform.

6. A machine, as in claim 1, in which the means to deliver fowl from the ground onto the traveling platform at said starting end thereof includes an elevator conveyor disposed at an upward incline from adjacent the ground, means transversely pivoting the upper end of the elevator conveyor in connection with the secondary frame adjacent such starting end of the traveling platform, and members supporting the lower end of the conveyor from and for movement along the ground upon and resulting from raising and lowering of the secondary frame.

7. A machine, as in claim 6, including cage means associated with and arranged to prevent escape of fowl from the elevator conveyor.

8. A machine, as in claim 6, including a substantially horizontal, low level feed-in conveyor unit having one end supported from and for movement along the ground, the other end being alined with and connected to the lower end of the elevator conveyor, and fowl walk-up ramps on said feed-in conveyor unit extending from substantially the working level thereof to adjacent the ground.

9. A machine, as in claim 1, in which said worker-supporting means comprises catwalks on the secondary frame at each side thereof; the cage means including a longitudinal row of doors along each side of the traveling platform and a distance above the corresponding catwalk.

10. A machine, for handling domestic fowl, comprising a longitudinal main frame supported from the ground, a longitudinal secondary frame above the main frame, power actuated jacks connected between the main frame and the secondary frame operative to raise and lower the latter to selected positions of vertical adjustment, a driven longitudinal conveyor on the secondary frame, means including a driven elevator conveyor operative to deliver fowl from the ground onto said longitudinal conveyor at the starting end thereof and in any position of vertical adjustment of said secondary frame, cage means enclosing said platform and arranged to prevent escape of fowl from the conveyors, said cage means including a longitudinal row of doors at each side of the longitudinal catwalk on each side of the secondary frame; each catwalk being disposed so as to support workers in position for manual access to the doors of the corresponding row thereof and to an adjacent tier of coops of a coop truck at the same side of the main frame.

References Cited

UNITED STATES PATENTS

| | | | |
|---|---|---|---|
| 406,248 | 7/1889 | Williams | 119—51 |
| 2,785,792 | 3/1957 | Cordis | 198—224 |
| 2,825,573 | 3/1958 | Shaw et al. | 214—83.1 |
| 2,840,041 | 6/1958 | Fleming | 119—82 |
| 3,103,915 | 9/1963 | Crain et al. | 119—82 |
| 3,110,388 | 11/1963 | Elliott et al. | 119—82 X |
| 3,220,585 | 11/1965 | McCartney et al. | 254—8 |
| 3,279,432 | 10/1966 | Forstmaier et al. | 119—15 |
| 3,292,581 | 12/1966 | Van Nest | 119—17 |
| 3,341,042 | 9/1967 | Carder | 214—512 |
| 3,370,727 | 2/1968 | Shaw | 214—512 |

ALDRICH F. MEDBERY, *Primary Examiner.*

U.S. Cl. X.R.

198—126

UNITED STATES PATENT OFFICE
CERTIFICATE OF CORRECTION

Patent No. 3,420,211 January 7, 1969

Norman W. Hartvickson

It is certified that error appears in the above identified patent and that said Letters Patent are hereby corrected as shown below:

Column 5, line 27, "horizontal" should read -- horizontally --. Column 6, line 36, after "catwalk" insert -- conveyor, and a longitudinal --.

Signed and sealed this 14th day of April 1970.

(SEAL)
Attest:

Edward M. Fletcher, Jr.
Attesting Officer

WILLIAM E. SCHUYLER, JR.
Commissioner of Patents